United States Patent [19]

Hagemann

[11] 4,200,922
[45] Apr. 29, 1980

[54] SELF-PROPELLED VEHICLE FOR DESTROYING GROUND MINES

[75] Inventor: Julius Hagemann, Panama City, Fla.

[73] Assignee: The United States of America as represented by the Secretary of the Navy, Washington, D.C.

[21] Appl. No.: 85,935

[22] Filed: Jan. 30, 1961

[51] Int. Cl.[2] .............................................. G01S 9/66
[52] U.S. Cl. ...................................... 367/96; 367/88; 367/106
[58] Field of Search ..................................... 114/20–25, 114/235–238; 244/14.3; 340/3, 6, 1, 5, ; 367/88, 96, 106

[56] References Cited

U.S. PATENT DOCUMENTS

| | | | |
|---|---|---|---|
| 1,315,122 | 9/1919 | Henslee | 114/235.2 |
| 2,632,038 | 3/1953 | Hofstadter | 114/25 |
| 2,853,824 | 9/1958 | Schutz et al. | 340/3 |
| 2,991,742 | 7/1961 | Steinberg | 114/23 |
| 3,005,973 | 10/1961 | Kietz | 340/3 |

FOREIGN PATENT DOCUMENTS 123598  3/1919  United Kingdom ................. 114/22

*Primary Examiner*—Richard A. Farley
*Attorney, Agent, or Firm*—Louis A. Miller; Rolla N. Carter

EXEMPLARY CLAIM

1. Apparatus for destroying a ground mine lying proud on the ocean floor comprising a self-propelled dirigible underwater vehicle carrying an explosive charge and having a catacoustic system for steering said vehicle in the azimuthal direction of a sound reflecting object, diving control surfaces carried by said vehicle, means for developing a control signal representative of the departure of the vehicle from a selected distance above the ocean floor, means responsive to said control signal for operating said diving control surfaces, and means responsive to a certain change in magnitude of said control signal within a selected time interval for releasing said explosive charge.

6 Claims, 3 Drawing Figures

SELF-PROPELLED VEHICLE FOR DESTROYING GROUND MINES

The invention described herein may be manufactured and used by or for the Government of the United States of America for governmental purposes without the payment of any royalties thereon or therefor.

The present invention relates to the destruction of a ground mine the presence and approximate location of which has been determined, and more particularly to a captive self-propelled dirigible underwater vehicle which will, when released in the vicinity of a detected mine, seek out and destroy the mine by depositing an explosive charge near the mine.

The vehicle of the invention may constitute a component of a mine hunting system which will locate, classify and destroy ground mines lying on the ocean floor. In on such system, towed classification components scan the ocean floor, presenting a high resolution picture of the bottom on a shipboard display with well-defined highlights and shadows similar to an obliquely lighted landscape. Bottom objects are seen in sufficient detail to enable ready classification of mines in the presence of debris and other bottom clutter. When a mine-like object appears on the display, a vehicle according to the invention is released to hunt down and "kill" the mine.

Heretofore, when a mine had been detected, either an underwater swimmer was dispatched to place an explosive charge on the mine or an explosive charge was dropped in the vicinity of the mine with a comparatively large probable error, i.e., in excess of 20 feet, thereby requiring a very large charge to assure destruction of the mine.

An object of the invention is to provide an automobile underwater vehicle which will, when released in the vicinity of a ground mine, home on and pass over the mine at a preselected altitude.

Another object of the invention is to provide a vehicle which when released from tow will run at a constant height above the bottom and release an explosive charge when the measured height abruptly decreases by an amount preselected as representative of a ground mine in unburied condition, i.e., proud, on the bottom.

A further object of the invention is to provision of such a vehicle which while under tow is subject to control of an operator aboard the towing vessel.

Other objects and features of the invention as well as advantages thereof will become apparent to those skilled in the art from the following description of a preferred embodiment of the invention as illustrated in the accompanying drawing in which.

The present invention includes a robot vehicle for use with a mine-hunting/destruction system wherein the vehicle is towed by means of an electrical control cable behind a minehunting vessel which is also towing moine classification gear. The vehicle is towed a sufficient distance to the rear of the classification gear to allow ample decision time and time to guide the vehicle to the point directly over a detected mine where it is released. The remotely actuated release disengages the vehile from its tow cable and automatically connects the rudder to searching and homing control and turns on the vehicle's power supply to activate the propulsion and guidance systems. The propulsion system brings the vehicle to its running speed of, say, 6 knots, the lateral rudders go into full deflection to one side and the diving vanes (horizontal rudders) go into full diving position so that the vehicle prescribes a steep downward spiral path until its height sensing system takes control to steady the vehicle so as to run at the selected height, say 4 feet, above the sea bottom. The vehicle continues to circle until its forwardly directed homing system senses the target, at which time the lateral rudder is straightened and the vehicle makes a straight run over the target. As the vehicle passes over the target, the abrupt decrease in the height sensed by the height sensing system, if larger than a preset valve, produces a signal to release a demolition charge which after a time delay detonates to destroy the target. The release of the charge disables the height control system and the vehicle surfaces to be retrieved. If in making its straight homing run the vehicle should pass to one side of the target, its homing system loses the target and immediately starts to circle again.

Figure 1:
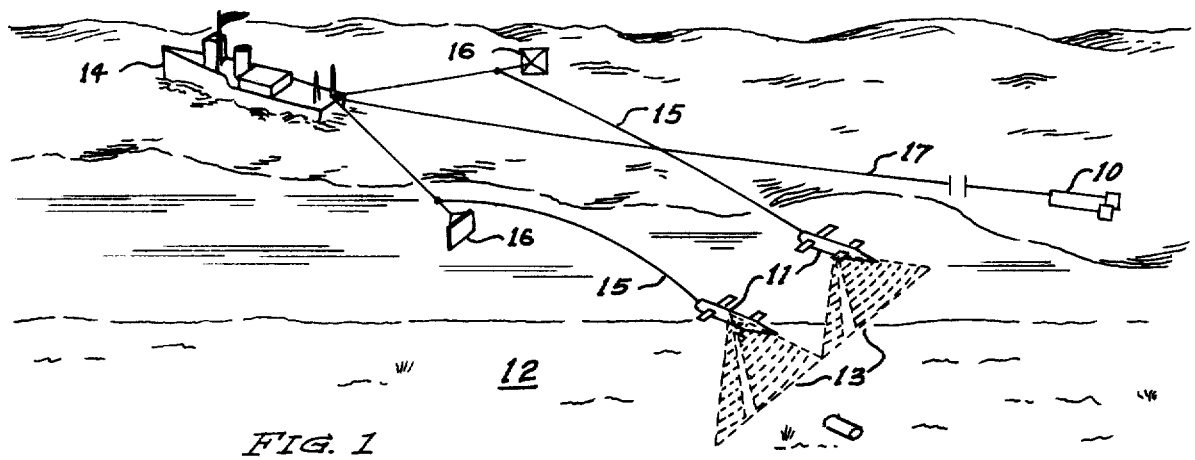
FIG. 1 is a schematic showing in perspective of a minehunting system utilizing the invention.
Figure 3:
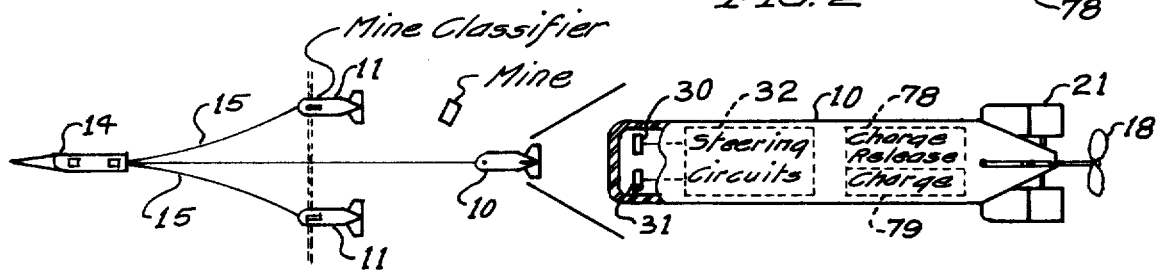
FIG. 3 is a plan view of a minehunting spread with emphasis on the vehicle of the invention.

Referring now to the drawing, there is shown in FIGS. 1 and 3 the vehicle 10 of the invention associated with a towed classification system to provide a mine hunting/destruction system. the classification system illustrated is of the type disclosed in my co-pending application Ser. No. 753,166, filed Aug. 4, 1958, entitled Facsimile Recording of Sonic Values of the Ocean Bottom. As here shown, two classification components 11 scan adjacent segments of the ocean floor 12 as indicated by the fan-shaped energy patterns 13 as the components 11 are towed at a fixed height above the bottom 12 by a ship 14 through tow cables 15 which are kept laterally separated the desired distance by diverters 16, all as is well known. The vehicle 10 is releasably attached to the distal end of a tow cable 17 containing electrical conductors and of sufficient length to provide decision and maneuvering time between when a target is classified as a mine and the time of arrival of the vehicle 10 over such target.

Figure 2:
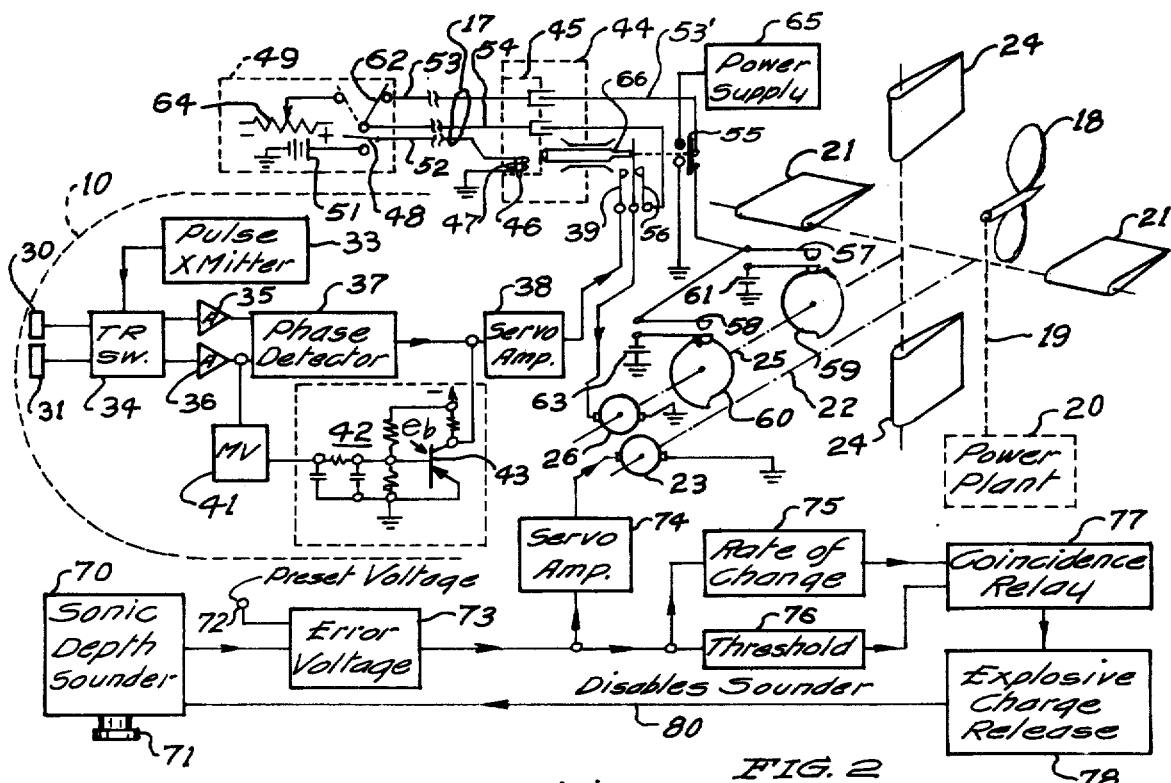
FIG. 2 is a diagrammatic view illustrating the various control systems for the vehicle of the invention.

As illustrated in FIGS. 2 and 3, the elongated torpedo-like vehicle 10 has a propeller 18 mounted on the drive shaft 19 of a power plane 20 for driving the vehicle 10 through the water when the power plant 20 is activated. Horizontally disposed diving vanes 21 are connected through a shaft 22 to be controlled by a servo motor 23; vertically disposed rudders 24 are similarly connected through a shaft 25 to be adjusted by a servo motor 26. This vehicle 10 is provided with an active catacoustic homing system including two bow transducers 30 and 31 having, respectively, directivity patterns which overlap and are directed forwardly and downwardly for controlling through steering circuits 32 and the servo motor 26 the rudders 24 to maintain substantially equal the outputs of the transducers 30 and 31 while receiving so that in the manner of an active homing torpedo the vehicle 10 will guide itself towards a target which strongly reflects acoustic energy periodically transmitted into the water by the transducers 30 and 31. More particularly, a pulse transmitter 33 periodically energizes the transducers 30 and 31 through a transmit-receive switch 34 to introduce into the water short pulses of acoustic energy.

Strongly reflected sound waves received by the transducer 30 and 31 are separately amplified in amplifiers 35 and 36 and fed to a phase detector 37 which compares their phases and develops a direct current voltage having a magnitude and polarity proportional to the sense and degree of the phase difference. The direct current output of the detector 37 controls through a servo amplifier 38 the servo motor 26 when a switch 39 is closed as hereinafter described. The output of one of the amplifiers, here shown as being amplifier 36, is also employed to actuate a square wave generator such as a multivibrator 41, the output of which is integrated in an RC circuit 42 and applied as a blocking bias voltage $e_b$ to a transistor 43 to keep it nonconducting. Before the vehicle finds or after it loses a target, there will be no square wave output of the multivibrator 41 and the bias voltage $e_b$ dissipates permitting the transistor 43 to conduct and post a strong signal on the input to the servo amplifier 38 causing it to drive the servo motor 26 to move the rudders 24 to full deflection in a preselected direction so that the vehicle 10 will circle until strongly reflected signals are received by the transducers 30 and 31, i.e., the homing system picks up a target, at which time the bias voltage $e_b$ is re-established to return rudder control to the homing system.

As shown in FIG. 2, the tow and conductor cable 17 is connected to the vehicle 10 by a release plug having a vehicle part 44 and a cable part 45 which are releasably secured together in any suitable manner, here indicated as a pin 46 which is removable from engaging relation by a solenoid 47 which may be energized at will by closing a switch 48 in a shipboard control panel 49. Closure of this switch 48 completes a circuit through a battery 51, a conductor 52 in the cable 17 and the solenoid 47. With the two parts 44 and 45 of the release plug engaged, two conductors 53 and 54 in the cable 17 are electrically connected through switches 55 and 56, respectively, to switches 57 and 58 and the servo motor 26. The two switches 57 and 58 are positioned to be actuated by cams 59 and 60, respectively, carried on the shaft 25 of the servo motor 26. The cam 59 is oriented on the shaft 25 so that a deviation of the rudder 24 in one direction from straight ahead will close the switch 57 to connect a battery 61 in circuit with the servo motor 26 when a switch 62 in the shipboard control panel 49 connects (as shown) the two cable conductors 53 and 54 in series. Conversely, the cam 60 is oriented on the shaft 25 so that deviation of the rudder 24 in the opposite direction from straight ahead will close the switch 58 to connect a battery 63 in circuit with the servo motor 26, it being understood that the batteries 61 and 63 are of the proper polarities for returning the rudders 24 to straight ahead position. An operator on shipboard can, by moving the switch 62 to the position shown in broken lines, remove rudder control from the cams 59 and 60 and by adjusting a voltage divider 64 control at will the deflection of the rudder 24. When the two parts 44 and 45 of the release plug are separated, a bar 66 carried in the vehicle part 44 moves to the left to change the connection of the servo motor 26 from the switch contact 56 to the switch contact 39 and moves the switch 55 to open the lead wire 53' and turn on the power supply 65.

The servo motor 23 for controlling the diving vanes 21 is energized by a height-above-the-bottom controlling apparatus shown in FIG. 2 as comprising a pinging type sonic depth sounder 70 including a downwardly directed and preferably forwardly inclined transducer 71. The sounder 70 is adjusted in a known manner to provide a high voltage output whenever a bottom return signal is not received within a certain time interval after a pinging pulse, and when the bottom return signal is received within this time interval the output of the sounder 70 corresponds to the distance the transducer 71 is above the bottom. This distance-from-the-bottom signal is compared with a preset voltage on a terminal 72 in an error voltage generator 73, the error voltage output of which through a servo amplifier 74 controls the diving vane servo motor 23. The error voltage output from the generator 73 is also fed in parallel through a rate of change circuit 75 and a threshold circuit 76 to a coincidence relay 77. The rate of change circuit 75 is adjusted to provide an output only when the error voltage from the circuit 73 increases at a certain rate, e.g., a rate corresponding to a change of depth of 10 inches in 1/10 second. The threshold circuit 76 is adjusted to provide an output whenever the error voltage applied to the servo amplifier 74 changes abruptly, say within less than 1/10 second, by an amount corresponding to a decrease in height above the bottom that is less than a certain amount, say 8 inches. When the coincidence relay 77 is satisfied by simultaneous outputs from the rate of change circuit 75 and the threshold circuit 76, it furnishes a release signal to an explosive charge release mechanism 78 causing it to release an explosive charge 79 (see FIG. 3). Actuation of the release mechanism 78 produces a pulse on a lead 80 for disabling the depth sounder 70 to cause the vehicle 10 to surface so that is may be retrieved.

It is desirable that the vehicle 10 when self-propelled maintain an altitude above the sea bottom which is as low as practicable so as to reduce the dispersion error of the charge drops and to allow a low angle of incidence of the sonic energy used in the homing device with resulting low backscattering from the sea bottom. In connection with the latter, it is advantageous to use characteristics for the transducers 30 and 31 to optimize the signal-to-bottom backscatter ratio. The horizontal width of their receiver sensitivity should be wide enough to ascertain easy target interception and reinterception during the search and homing phase. An angle of, for instance, 20 degrees (at the 6 db down points of the receiver characteristic) and 33 degrees at the first (theoretical) null may be employed. The axes of the transducers 30 and 31 should be inclined downwards not more than say 5 degrees commensurate with the vertical transducer characteristic so as to realize high receiver sensitivity for echo returns from a mine target at a far distance (order of 100 feet). On the other hand, after having approached the target, it should be still intercepted within the transducer beam (although at a much decreased sensitivity) up to a distance of some 100 feet. For a height of say 4 feet, the first null of the transducer then should be at some 30 degrees.

In operation, with the ship 14 under way down a channel to be cleared of ground mines, the bottom scanning components 11 provide the shipboard operator with a display showing topographic characteristics of the area scanned. The vehicle 10 is towed aft of the scanning components 11 a sufficient distance (about 1 minute travel time) for decision making with the switch 62 in the shipboard control panel 49 in the enabling position shown in FIG. 2 with the servo motor 26 under the control of the cams 59 and 60 to keep the rudders 24 amidship so that the vehicle 10 tows dead astern. When the shipboard display indicates what is decided to be a mine-like object, the operator moves the switch 62 to place the rudders 24 under the control of the voltage divider 64 which the operator adjusts to steer the vehicle 10 to a collision course with the vertical extending through the mine-like target. When the vehicle 10 reaches the approximate location directly over the target, the operator closes the switch 48 to withdraw the retaining pin 46 and permit the cable part 45 of the release plug to pull away from the vehicle part 44 of this plug, which action permits the bar 66 to move to the left thereby completing the circuit from the servo amplifier 38 to the servo motor 26 through the switch contact 39 and simultaneously therewith the switch 55 connects in the power supply 65 for energizing the several operating components of the vehicle 10. Immediately upon release, the rudders 24 are fully deflected in a preselected direction since there is no output from the multivibrator 41 to keep the transistor 43 from conducting. Energization of the sonic depth sounder 70 immediately placed the vanes 21 in full dive position so that the vehicle 10 spirals toward the bottom unti the preselected height above the bottom is reached at which height it continues to circle until its homing system receives strong signals reflected by the target, at which time it steers in the azimuthal direction of the target. When the vehicle 10 passes over the target having dimensions which are mine-like, the depth sounder 70 experiences an abrupt decrease in the depth it is sensing and produces a signal which passes both the rate of change circuit 75 and the threshold circuit 76 to satisfy the coincidence relay 77 with a resulting release of the explosive charge 79. The release of the charge disables the depth sounder 70 and the vehicle 10 immediately heads for the surface leaving the charge 79 to destroy the mine after a time interval determined by its built-in delay.

While for the purpose of disclosing the invention a preferred embodiment has been described in detail, it will be evident to those skilled in the art that numerous modifications or alternations may be made therein without departing from the spirit of the invention, the scope of which is set forth in the appended claims.

What is claimed is:

1. Apparatus for destroying a ground mine lying proud on the ocean floor comprising a self-propelled dirigible underwater vehicle carrying an explosive charge and having a catacoustic system for steering said vehicle in the azimuthal direction of a sound reflecting object, diving control surfaces carried by said vehicle, means for developing a control signal representative of the departure of the vehicle from a selected distance above the ocean floor, means responsive to said control signal for operating said diving control surfaces, and means responsive to a certain change in magnitude of said control signal within a selected time interval for releasing said explosive charge.

2. In a self-propelled demolition unit for the destruction of a ground mine lying on the ocean floor and adapted to seek and run at a constant height above the ocean floor, a sonic depth sounder for deriving a control voltage proportional in magnitude to the height above the bottom, a demolition charge, means for releasing said charge, and circuit means responsive to a change in the magnitude of said control voltage corresponding to a certain decrease in height above the bottom occurring at least at a preselected rate for actuating said releasing means.

3. In a demolition unit in accordance with claim 2 wherein said circuit means for actuating said releasing means comprises a rate of change circuit and a threshold circuit connected in parallel to receive said control voltage and having output terminals, and coincidence means connected to said output terminals.

4. In a system for the detection and destruction of ground mines using ship towed components to scan an area of the ocean floor and shipboard means presenting a display characteristic of the topography of the area scanned, a derigible vehicle adapted when energized to seek out and destroy a mine, a conductor cable releasably secured to said vehicle for towing said vehicle aft of said scanning components, means under the remote control of a shipboard operator for guiding said vehicle to the point over a target decided to be minelike, means under the control of said operator for releasing said vehicle from said cable, and means operative upon such release for energizing said vehicle.

5. A system according to claim 4 in which the guiding means for said vehicle comprises a servo motor having a shaft and rudders mounted to be deflected by rotation of said shaft, and including control means when enabled to so control said servo motor as to move said rudders amidships, and means under the remote control of a shipboard operator for selectively enabling and disabling said control means.

6. A system according to claim 5 including means operative upon the release of said vehicle from said cable for disabling said control means.

* * * * *